United States Patent Office 3,574,213
Patented Apr. 6, 1971

3,574,213
4,6-DI(LOWER ALKYL) PYRIMIDIN-2-YL PHTHALAZINE
John J. D'Amico, Dunbar, W. Va., assignor to Monsanto Company, St. Louis, Mo.
No Drawing. Application Oct. 11, 1967, Ser. No. 705,572, now Patent No. 3,454,572, which is a division of application Ser. No. 513,558, Dec. 13, 1965, now Patent No. 3,379,700. Divided and this application Oct. 1, 1968, Ser. No. 766,026
Int. Cl. C07d 57/00
U.S. Cl. 260—256.5       2 Claims

ABSTRACT OF THE DISCLOSURE

S-(phthalazin-1-yl)- and S-(1H-1,2,4-triazol-5-yl)-thioazoles, thiopyrimidines, and dithiocarbamates are described which are useful for accelerating vulcanization of rubber.

---

This is a division of application Ser. No. 705,572, filed Oct. 11, 1967, now U.S. Pat. 3,454,572, which is a division of Ser. No. 513,558, filed Dec. 13, 1965, now U.S. Pat. 3,379,700.

This invention relates to derivatives of phthalazine. The invention further relates to new chemical compounds useful as vulcanization accelerators in rubber.

An object of this invention is to provide new and useful chemical compounds for industry. A further object of this invention is to promote the progress of science and useful arts. Other objects will become apparent as the description proceeds.

The new compounds of the invention may be represented by the formula

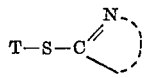

In general, T is a radical having carbon attached to the sulfur shown, which carbon in turn is either singly or doubly linked to nitrogen. T may be a pyrimidine ring. More particularly, T may be 4,6-di(lower alkyl)-pyrimidin-2-yl. For example, where the radical

is phthalazin-1-yl, T may be 4,6-dimethyl-pyrimidin-2-yl. In this invention, the term "lower" includes 1 to 8 carbon atoms.

The new compounds of this invention are prepared as follows:

The compound 1-(4,6-dimethyl-2-pyrimidinylthio)-phthalazine is prepared by adding in one portion 33 grams (0.2 mole) of 1-chloro-phthalazine to a stirred solution containing 35.4 grams (0.2 mole) of 4,6-dimethyl-2-pyrimidinethiol hydrochloride, 600 ml. ethyl alcohol, and 26.4 grams (0.4 mole) of 85% potassium hydroxide. The stirred reaction mixture is heated at 75°–80° C. for 24 hours. The mixture is cooled to 25° C. and 500 ml. of water is added. Stirring is continued for 15 minutes at 25°–30° C. The resulting solid is collected by filtration, washed with water until the washings are neutral to litmus, and air-dried at 25°–30° C. The product, melting point 184°–186° C., is obtained in an 18.7% yield. After recrystallization from ethyl alcohol, a sample of the product melts at 189°–190° C. Analysis of the 1-(4,6-dimethyl-2-pyrimidinylthio)phthalazine shows 20.53% nitrogen and 11.71% sulfur. Calculated percentages for $C_{14}H_{12}N_4S$ are 20.88% nitrogen and 11.95% sulfur.

The following illustrates the useful properties of the compounds of this invention as vulcanization accelerators in sulfur-vulcanizable rubber. For the rubber stocks tested and described below, as illustrative of the utility, Mooney scorch times were determined by means of a Mooney plastometer. The time $t_5$ represents the time in minutes required for the Mooney reading to rise five points above the minimum viscosity of the rubber.

The compound 1-(4,6-dimethyl-2-pyrimidinylthio) phthalazine is an accelerator for the vulcanization of rubber comparable to MBT but much less scorchy than MBT. The Mooney Scorch reading at 135° C., $t_5$, for a natural rubber stock containing MBT shows five minutes. The same stock without MBT but containing 1-(4,6-dimethyl-2-pyrimidinylthio)phthalazine shows 10.7 minutes for $t_5$. The remaining compounds of this invention are also useful vulcanization accelerators in rubber. MBT designates 2-mercaptobenzothiazole.

It is intended to cover all changes and modifications of the examples of the invention herein chosen for purposes of disclosure which do not constitute departures from the spirit and scope of the invention. The matter contained in each of the following claims is to be read as part of the general description of the present invention.

I claim:
1. A compound of the formula

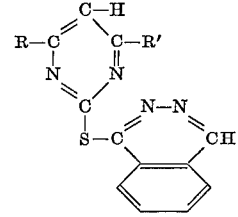

wherein R and R' are lower alkyl.
2. A compound according to claim 1 wherein R and R' are methyl.

References Cited
UNITED STATES PATENTS
3,454,572   7/1969   D'Amico _____ 260—256.5

ALEX MAZEL, Primary Examiner
R. J. GALLAGHER, Assistant Examiner

U.S. Cl. X.R.
260—791